United States Patent Office 2,819,709
Patented Jan. 14, 1958

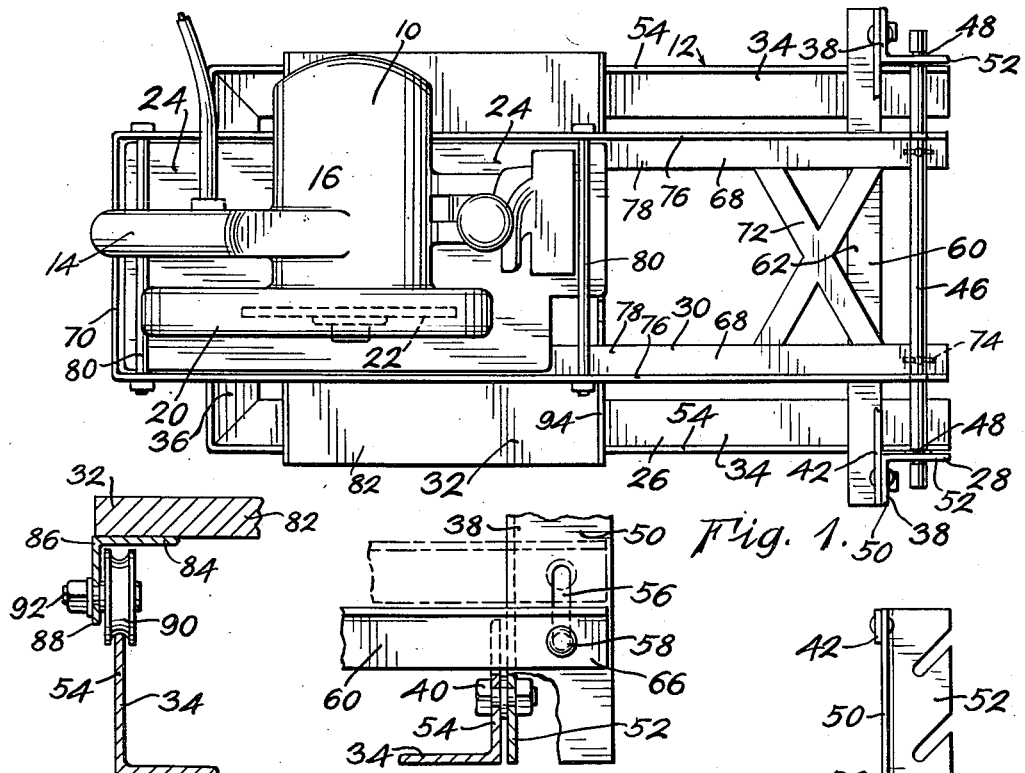
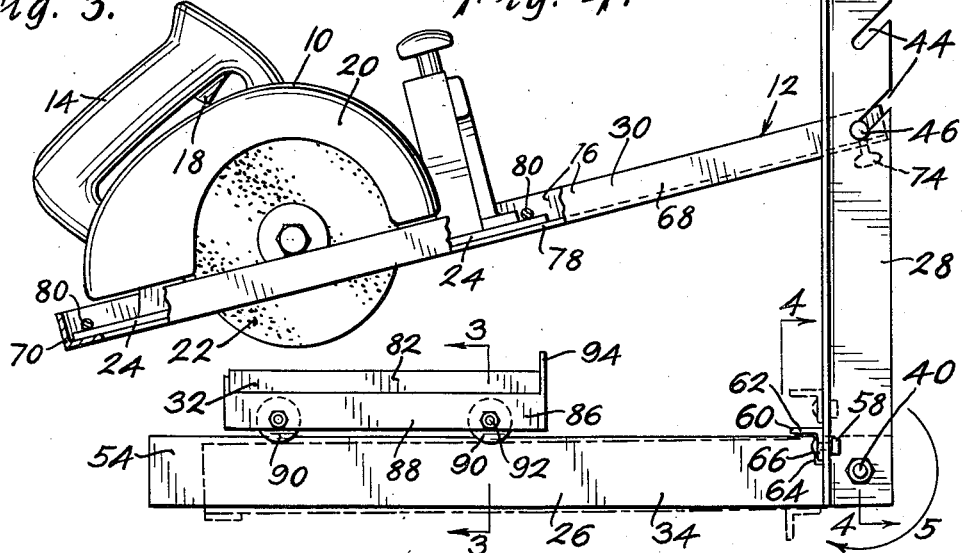

2,819,709

MASONRY SAW FRAME

Richard K. MacGregor, Englewood, Colo.

Application August 9, 1956, Serial No. 602,959

9 Claims. (Cl. 125—13)

This invention relates to masonry saws; and, more particularly, to a portable masonry saw formed by attaching a conventional portable electric saw to a portable and foldable supporting frame.

Building contractors, and particularly brick contractors, require the use of a masonry saw in order to accomplish many of the common brick or stone-cutting operations. The conventional masonry saws, however, are large, expensive and difficult to transport from place to place. The usual masonry saw costs several hundred dollars and is useful only for cutting brick and stone. By reason of cost alone, these saws are beyond the reach of most masons and many of the smaller brick contractors. Even renting this equipment can result in considerable expense.

Also, the ordinary brick or masonry saw is a large, heavy and bulky piece of equipment that is difficult to move from place to place on the same job or from job to job. Hence, their use is somewhat limited to the larger contractors and those having an unusual amount of brick and stone cutting to do.

On the other hand, lightweight, portable electric saws are relatively inexpensive and are included among the personal tools of nearly all carpenters and many persons in allied building trades. Most of the well-known manufactures of these saws, and there are several, produce heavy-duty models having blades with an 8-inch radius or more that are entirely adequate insofar as power is concerned to accomplish brick and stone cutting if they could be adequately supported.

It is, therefore, the principal object of the present invention to provide a portable and foldable saw frame adapted to receive a conventional portable, electric power saw and connect it to use as an effective and efficient masonry saw.

A second object of the invention is to provide a portable saw frame which is adapted for use with any of the commercially available portable power saws.

A third object of the invention is to provide a saw frame that requires no alteration or adaptation of the saw attached thereto; and, hence, permits the saw to be readily detached therefrom for use in the conventional manner.

Another object of the invention is to provide a saw frame that incorporates a novel latch to maintain the upright frame in operative relation to the bed frame thereof.

Further objects of the invention are to provide a saw frame which is lightweight, portable, compact, adjustable, versatile and inexpensive.

Other objects will be in part apparent and in part pointed out specifically hereinafter in connection with the description of the drawing that follows, and in which:

Figure 1 is a top plan view of the masonry saw of the present invention;

Figure 2 is a side elevation thereof;

Figure 3 is a section taken along line 3—3 of Figure 2 showing the manner in which the table is mounted for rolling movement on the bed frame; and, Figure 4 is a section taken along line 4—4 of Figure 2 disclosing the latching means interconnecting the upright frame to the bed frame.

Referring now to the drawing, the masonry saw of the present invention will be seen to comprise a conventional portable electric power saw 10 detachably connected to foldable and portable masonry saw frame indicated in a general way by numeral 12. The saw 10 is of the usual type having a handle 14, a motor 16, a trigger-type on-and-off switch 18, a blade guard 20, a circular blade or cutter 22 and a bed-plate 24. The bed-plate of similar design to that shown is found on all saws of this type as it rests on top of the surface being cut and forms a stop to limit the depth of cut by the blade or cutter. This blade is substantially planar although certain models are designed to provide slightly upturned forward and rear ends, not shown. The bed-plate of the saw is the portion thereof that is attached to the saw frame in a manner which will presently be described. Also, most of these saws are tiltable relative to the bed-plate both to regulate the depth of cut and to tilt the blade or cutters relative to the work-piece. Therefore, by effecting attachment of the saw to the frame by means of the bed-plate, these useful adjustment features of the saw are unimpaired.

In general, the saw frame 12 comprises a bed or base frame 26, an upright frame 28 foldable relative to the bed frame and hingedly connected thereto, a swinging frame 30 removably attached to the upright frame for swinging upward and downward movement in a substantially vertical plane with the saw supported thereon, and a table 32 mounted on the bed frame for rolling movement back and forth beneath the cutter of the saw. The bed frame 26 includes angle iron side frame members 34 arranged in spaced parallel relation and interconnected at one end by the cross frame member 36. The bed frame is adapted to lay flat on a supporting surface such as the ground, a platform or other convenient support.

The upright frame 28 is formed by upright angle iron frame members 38 arranged in substantially spaced parallel relation and attached at their lower ends to the free ends of the frame members 34 of the bed frame by bolts 40 for swinging pivotal movement from the full-line operative position of Figure 2 to the dotted line inoperative or folded position. Cross brace 42 connects the upper ends of frame members 38 in the upright frame.

In the particular embodiment illustrated in the drawing, the vertical webs 54 of frame members 34 are on the outside and the upright frame is connected on the outside of the bed frame. It will be apparent, of course, that a simple rearrangement of parts would make it possible to mount the upright frame inside the bed frame, if desired. Also, the width of the bed frame and upright frame is somewhat less than the actual device in order to conserve space on the drawing. Although not shown, both the bed frame and the upright frame can be provided with additional struts or braces as desired to render the structure more rigid.

In Figure 2 it will be noted that the coplanar webs 50 of the upright frame members 38 lie nearest the saw; whereas, the parallel webs 52 project rearwardly therefrom. "Forwardly" as used herein referring to the direction in which the table moves toward the saw and "rearwardly" to the direction the table moves away from the saw and toward the upright frame. Therefore, the rear edges of the parallel webs 52 of frame members 38 will be seen to contain a plurality of spaced notches 44 inclined downwardly and forwardly. The notches in each of the upright frame members are transversely aligned so that pivot rod 46 carried therein is substantially parallel to the surface of the bed frame. Rod 46 is provided with annular grooves 48 positioned to receive the parallel webs 52 of the upright frame members, as shown, and prevent relative transverse movement therebetween.

The coplanar webs 50 of the upright frame members are provided with vertical slots 56 shown only in Figure 4, that receive bolts 58 by which latch member 60 is attached to the upright frame for upward and downward sliding movement. Horizontal web 62 of the latch member 60 overlies the top edge of vertical webs 54 of frame members 26 in the bed frame that contain notches 64 to receive vertical web 66 of said latch member. With the upright frame 28 in operative unfolded relation relative to the bed frame 26, as shown by full lines in Figures 1, 2 and 4, vertical web 66 of the latching member fits into notch 64 in the bed frame and locks said bed and upright frame in this relation. When, however, the latch member 60 is raised into the dotted line position of Figures 2 and 4, the upright frame may be swung downwardly in the direction of arrow 5 Figure 4 into the dotted line folded position shown therein. The swinging frame 30 is attached at its rear end to rod 46 for transverse adjustment and upward and downward swinging movement relative to the bed and upright frames. The swinging frame includes spaced parallel side frame members 68 interconnected at their forward ends by cross frame member 70. Braces 72 hold the side frame members 68 in fixed relation. The rear ends of the side frame members 68 are mounted on rod 46 for transverse slidable movement to adjust the saw relative to the table 32. Thumb screws, one of which has been shown in Figure 2 in dotted lines and has been indicated by numeral 74, are used to maintain the swinging frame in adjustable relation. The notches 44 in the upright frame member 28, of course, provide means for adjusting the height of the swinging frame and saw relative to the table to accommodate different sized work pieces.

The vertical webs 76 of side frame members 68 are spaced apart approximately the width of bed plate 24 of the saw so that said bed plate will fit therebetween. The co-planar webs 78 of the side frame members 68 lie inside the vertical webs and provide support for the bed plate of the saw. Also, the space between the coplanar webs 78 provides room for the cutter of the saw to operate and be tilted from side to side as in making angular cuts. Bolts 80 extend between the vertical webs 76 of the side frame members 68 and across the front and rear portions of the bed plates, thereby forming the means by which the saw is detachably connected to the swinging frame.

Table 32 consists of a platform 82 fastened to the horizontal webs 84 of side frame members 86 mounted in spaced parallel relation therebeneath. The vertical webs 88 that project downwardly therefrom are each provided with two grooved wheels 90 mounted for rotation on axle 92. The transverse spacing of the grooved wheels is such that they ride upon the upper edge of vertical web 54 of the side frame members 26 which form a track. Thus, the table may be rolled forwardly and rearwardly underneath the cutter. A transverse stop 94 is preferably provided along the rear edge of the table to hold the work piece as it is moved forwardly on the table into the saw in the conventional manner.

From the foregoing description of the masonry saw frame of the present invention it will be apparent that the several useful objects for which it was designed have been achieved. Although the invention has been described in connection with the one specific form thereof illustrated in the accompanying drawing, I realize that certain modifications may be made by those skilled in the art without departing from the intended scope of the invention; and, therefore, it is my intention that the scope of protection afforded hereby shall be limited only insofar as said limitations are expressly set forth in the appended claims.

What is claimed is:

1. In combination: a portable saw frame comprising a bed frame adapted to be laid flat on a supporting surface, a work-piece supporting table mounted on the bed frame for forward and rearward movement relative thereto, an upright frame hingedly attached to one end of the bed frame for movement into folded inoperative position relative thereto, latch means interconnecting the upright frame and bed frame for maintaining the operative relation therebetween, a swinging frame carried by the upright frame for upward and downward swinging movement above and relative to the bed frame, the swinging frame including spaced side elements arranged to permit insertion of the bed plate of a portable saw therebetween, said side elements including portions positioned beneath the bed plate in supporting relation thereto and portions extending upwardly in position to maintain the bed plate therebetween and means carried by the swinging frame for detachably connecting a portable electric saw thereto in position to cut a work piece moved thereunder on the supporting table.

2. A device in accordance with claim 1 in which the swinging frame is attached to the upright frame for upward and downward adjustment relative thereto.

3. A device in accordance with claim 1 in which the swinging frame is attached to the upright frame for upward, downward and lateral adjustment relative thereto.

4. A device in accordance with claim 1 in which the saw-attaching means comprises bolt-like elements extending between the side elements of the swinging frame across the top of the bed plate and on opposite ends thereof.

5. A portable and foldable masonry saw frame comprising: a bed frame adapted to be laid flat on a supporting surface; a work-piece supporting table mounted on the bed frame for forward and rearward movement relative thereto; an upright frame hingedly attached to one end of the bed frame for movement into folded inoperative position relative thereto; latch means interconnecting the upright frame and bed frame for maintaining the operative relation therebetween; a swinging frame carried by the upright frame for upward and downward swinging movement above and relative to the bed frame; and, means carried by the swinging frame for detachably connecting a portable electric saw thereto in position to cut a work piece moved thereunder on the supporting table.

6. A device in accordance with claim 5 in which the swinging frame is upwardly, downwardly and laterally adjustable relative to the upright frame.

7. A device in accordance with claim 5, in which the swinging frame included parallel side elements positioned and adapted to lap the side edges of the bed plate on a portable electric saw, said side elements having portions thereof positioned to support the saw along the under side of the bed plate and portions adapted to prevent relative lateral movement of the saw.

8. A portable and foldable masonry saw frame comprising: a bed frame adapted to be laid flat on a supporting surface, said frame having spaced parallel side elements forming a track; a work-piece supporting table mounted on the track formed by the bed frame for forward and rearward rolling movement; an upright frame attached to one end of the bed frame in substantially right-angular relation thereto, said upright frame including spaced upright elements pivotally attached to the ends of the side frame means of the bed frame in lapping relation to form means for folding said bed frame into said upright frame; latch means operatively interconnecting the bed frame and upright frame to maintain the operative right-angular relation therebetween; a swinging frame mounted on the upright frame for upward and downward swinging movement above and relative to the bed frame; and, bolt means for attaching a portable electric saw to the swinging frame in position to saw a work piece moved thereunder on the supporting table.

9. A device in accordance with claim 8 in which the latch means comprises a laterally extending member mounted between the upright elements of the upright frame for upward and downward movement against the side elements of the bed frame; and in which, the side elements of the bed frame are slotted to receive said laterally extending members in latching position.

References Cited in the file of this patent

UNITED STATES PATENTS 2,441,535     Sanders ---------------- May 11, 1948